United States Patent [19]

Kamiyama

[11] 4,213,788
[45] Jul. 22, 1980

[54] FLUORIDE AND PHOSPHATE CONTAINING OPTICAL GLASS

[75] Inventor: Kouzi Kamiyama, Odawara, Japan

[73] Assignee: Fuji Photo Film Co., Ltd., Minami-ashigara, Japan

[21] Appl. No.: 19,800

[22] Filed: Mar. 12, 1979

[30] Foreign Application Priority Data

Mar. 30, 1978 [JP] Japan ................................. 53-37211

[51] Int. Cl.$^2$ ........................... C03C 3/16; C03C 3/18
[52] U.S. Cl. ..................................................... 106/47 Q
[58] Field of Search ....................................... 106/47 Q

[56] References Cited

U.S. PATENT DOCUMENTS

| | | | |
|---|---|---|---|
| 3,492,136 | 1/1970 | Broemer et al. | 106/47 Q |
| 3,656,976 | 4/1972 | Izumitani et al. | 106/47 Q |
| 3,743,492 | 7/1973 | Ogita | 106/47 Q |
| 3,836,375 | 9/1974 | Broemer et al. | 106/47 Q |
| 3,847,624 | 11/1974 | Broemer et al. | 106/47 Q |
| 3,954,484 | 5/1976 | Broemer et al. | 106/47 Q |
| 4,040,846 | 8/1977 | Broemer et al. | 106/47 Q |
| 4,120,814 | 10/1978 | Izumitani et al. | 106/47 Q |

*Primary Examiner*—O. R Vertiz
*Assistant Examiner*—Mark Bell
*Attorney, Agent, or Firm*—Sughrue, Rothwell, Mion, Zinn and Macpeak

[57] ABSTRACT

An optical glass comprising in mole % 8 to 11% $Al(PO_3)_3$, 0.5 to 5% $MPO_3$, 5 to 25% $BaF_2$, 10 to 35% $SrF_2$, 5 to 30% $CaF_2$; 5 to 20% $MgF_2$, 13 to 30% $AlF_3$, and 0 to 10% $LaF_3+YF_3$, wherein the mole ratio of fluorine to phosphorus (F/P) in the composition is 6.5 or less and M represents Li, Na or K, which glass has a refractive index ranging from 1.47 to 1.53 and an Abbe's number ranging from 77 to 85.

6 Claims, No Drawings

FLUORIDE AND PHOSPHATE CONTAINING OPTICAL GLASS

BACKGROUND OF THE INVENTION

1. Field of the Invention

The present invention relates to an optical glass containing as glass-forming components both fluoride and phosphate ions, and not containing beryllium, arsenic, thorium, lead and other metal ions detrimental to health. This glass can be produced on an industrial scale and possesses a very high Abbe's number.

2. Description of the Prior Art

An optical glasses containing a fluoride-phosphate system, those which contain both alkali metaphosphates and fluorides in large amounts, as disclosed in Japanese Patent Publication 8,459/57, and those which are free from alkali metal metaphosphates and alkaline earth metal metaphosphates, as disclosed in Japanese Patent Publication No. 32,177/69 and so on, are hitherto reported. However, the optical glass of this kind gives rise to striae and devitrification resulting from vaporization of fluorine during fusing and casting and as a result the production of a large-size glass block on an industrial scale is difficult.

SUMMARY OF THE INVENTION

The object of the present invention is to provide a fluoride and phosphate containing optical glass which comprises small amounts of alkali metaphosphates and whose composition is adjusted such that the optical glass becomes fusible at a relatively low temperature of 800° to 1,100° C. and further, such that it is possible to cast the optical glass into a mold at a low temperature of 650° to 750° C. and thereby, vaporization of fluorine can be prevented, which glass is, consequently, stable to devitrification and has excellent chemical durability.

The above-described object is attained with an optical glass comprising 8 to 11 mole % of $Al(PO_3)_3$, 0.5 to 5 mole % $MPO_3$, where M represents at least one of Li, Na or K, wherein the sum of the contents of these phosphates ranges preferably from 13 mole % to 16 mole %; 5 to 25 mole % of $BaF_2$, 10 to 35 mole % of $SrF_2$, 5 to 30 mole % of $CaF_2$, 5 to 20 mole % of $MgF_2$, wherein the sum of the contents of these alkaline earth fluorides ranges preferably from 40 mole % to 83 mole %; 13 to 30 mole % of $AlF_3$; and 0 to 10 mole % of $LaF_3+YF_3$; in which the mole ratio of fluorine to phosphorus (F/P) is 6.5 or less, preferably 4.7 to 6.5, the refractive index ($\eta d$) of the glass is 1.47 to 1.53 and the Abbe's number ($\nu d$) of the glass is 77 to 85 when the composition of the glass is as described.

DETAILED DESCRIPTION OF THE INVENTION

In accordance with the present invention the alkaline earth metal fluorides are preferably present in a combined amount of 40 to 83 mole %. Furthermore, from the standpoint of reducing the melting point a combination of alkaline earth metal fluorides is more advantageous than the use of one fluoride alone.

$BaF_2$ and $SrF_2$ each renders the composition stable to devitrification, but increases dispersion. Therefore, $BaF_2$ is present in an amount of 5 to 25 mole %, and $SrF_2$ is present in an amount of 10 to 35 mole %. $CaF_2$ is advantageously used since it does not appreciably increase dispersion, but it has a melting point of 1,360° C., which is the highest of the alkaline earth metals fluorides, and therefore, $CaF_2$ tends to be unstable toward devitrification. Accordingly, $CaF_2$ can be present in the composition in amounts of 5 to 30 mole %. $MgF_2$ is of great advantage because it does not increase the dispersion, but it is quite unstable to devitrification. Therefore, $MgF_2$ can be contained in the composition in amounts of 5 to 20 mole %.

$AlF_3$ has a melting point of 1,030° C., which is relatively low, and it is effective as an introduction for the fluorine. Accordingly, a content of 13 mole % or more is required for $AlF_3$. However, it is hard to obtain a source of $AlF_3$ having high purity and stable content, compared with other sources for fluorides. Accordingly, the use of $AlF_3$ in large amounts renders the refractive index unstable. In addition, taking into account the stability of the composition to devitrification, the upper limit of $AlF_3$ content is set at 30 mole %.

$LaF_3$ and $YF_3$ each is advantageous for not only increasing the refractive index without an accompanying appreciable increase in dispersion but also for improving the chemical durability of the composition, but they are not stable to devitrification. Therefore, they can be contained in a combined amount of 0 to 10 mole %. $LaF_3$ is more stable to devitrification than $YF_3$ and for this reason may be preferred.

$Al(PO_3)_3$ can help stabilize the composition to devitrification only when it is contained in a proportion of 8 mole % or more. However, the content of 12 mole % or more gives rise to an increase in dispersion and therefore, such a high content is undesirable.

Introduction of a small amount of $MPO_3$ (alkali metaphsphate) not only lowers the melting temperature of the glass but is effective for suppressing devitrification. Namely, when $KPO_3$ is added in a proportion of 4 mole % to a glass having a composition of 17 mole % of $BaF_2$, 22 mole % of $SrF_2$, 20 mole % of $CaF_2$, 11 mole % of $MgF_2$, 21 mole % of $AlF_3$ and 9 mole % of $Al(PO_3)_3$, the temperature at which devitrification occurs is depressed by 30° C. or more. However, the introduction of $MPO_3$ in a large amount causes deterioration in chemical durability. Accordingly, a content of 0.5 to 5 mole % is preferred. In addition, taking into account the stability of the glass, its optical characteristics and so on, the combined content of $Al(PO_3)_3$ and $MPO_3$ ranges preferably from 13 to 16 mole %.

Taking into account the above-described permissible ranges with respect to individual components, a desirable mole ratio for the amount of fluorine to the amount of phosphorus (F/P) is 6.5 or less, preferably 4.7 to 6.5.

In the production of the optical glass of the present invention, fusing, stirring, refining, and cooling treatments are carried out at a relatively low temperature of 800° to 1,100° C. in order to prevent the vaporization of fluorine. In the course of these treatments, it is desirable to put a pot in a steady nonoxidizing atmosphere, e.g. nitrogen or an inert gas such as HE, Ne, Ar, Kr, etc.

In addition, the optical glass of the present invention is cast into a mold at a low temperature of 650° to 750° C. in the air. This is because vaporization of fluorine increases steeply at a temperature of about 760° C. or higher, which can be confirmed by measurement with a thermo-balance and by vaporization of fluorine aluminium phosphate deposites selectively on surfaces in contact with the air in such a temperature range, resulting in the appearance of striations and devitrification.

The optical glass having the composition of the present invention possesses a refractive index ($\eta d$) of 1.47 to 1.53 and an Abbe's number ($\nu d$) of about 77–85. In the following table, data regarding the index of refraction and Abbe's number of specific examples of fluoride and phosphate containing optical glass in accordance with the present invention are listed together with their respective mole % and wt. % compositions and their respective mole ratios of fluorine to phosphorus (F/P).

The components as described in the table were charged in a pot such that the compsition described in the table were attained, followed by fusing, stirring and refining in a conventional manner at a relatively low temperature of 800° to 1,100° C. so as to prevent the vaporization of fluorine. The melted glass composition was cooled to 650° to 750° C. in air and cast into a mold. The optical constants [index of refraction ($\eta d$) and Abbe's number ($\nu d$)] of the resulting glass were measured and the results are shown in the table below.

Table

| Sample No. | Al(PO$_3$)$_3$ M | Al(PO$_3$)$_3$ W | KPO$_3$ M | KPO$_3$ W | NaPO$_3$ M | NaPO$_3$ W | AlF$_3$ M | AlF$_3$ W | BaF$_2$ M | BaF$_2$ W | SrF$_2$ M | SrF$_2$ W | CaF$_2$ M | CaF$_2$ W | MgF$_2$ M | MgF$_2$ W | LaF$_3$ M | LaF$_3$ W | Mole Ratio (F/P) | $\eta d$ | $\nu d$ |
|---|---|---|---|---|---|---|---|---|---|---|---|---|---|---|---|---|---|---|---|---|---|
| 1 | 9 | 18.8 | 5 | 4.7 | — | — | 15 | 10.0 | 22 | 30.5 | 19 | 18.9 | 19 | 11.7 | 11 | 5.4 | — | — | 5.8 | 1.4915 | 81.2 |
| 2 | 10 | 22.8 | 3 | 3.1 | 2 | 1.8 | 22 | 16.0 | 7 | 10.6 | 23 | 25.0 | 21 | 14.2 | 12 | 6.5 | — | — | 5.5 | 1.4885 | 80.4 |
| 3 | 11 | 24.3 | 2 | 2.0 | — | — | 22 | 15.5 | 8 | 11.8 | 26 | 27.4 | 21 | 13.8 | 10 | 5.2 | — | — | 5.6 | 1.4894 | 82.3 |
| 4 | 10 | 21.5 | 4 | 3.8 | — | — | 20 | 13.7 | 15 | 21.5 | 21 | 21.6 | 20 | 12.8 | 10 | 5.1 | — | — | 5.6 | 1.4946 | 81.5 |
| 5 | 8 | 17.2 | 5 | 4.8 | — | — | 14 | 9.6 | 20 | 28.5 | 20 | 20.5 | 21 | 13.3 | 12 | 6.1 | — | — | 6.5 | 1.4930 | 81.5 |
| 6 | 10 | 21.0 | 5 | 4.7 | — | — | 18 | 12.1 | 17 | 23.7 | 18 | 18.0 | 20 | 12.4 | 10 | 5.0 | 2 | 3.1 | 5.4 | 1.5000 | 80.5 |
| 7 | 11 | 24.6 | 4 | 3.4 | — | — | 19 | 13.5 | 7 | 10.8 | 26 | 27.6 | 20 | 13.2 | 13 | 6.9 | — | — | 5.1 | 1.4900 | 81.0 |
| 8 | 11 | 24.1 | 3 | 2.9 | — | — | 21 | 14.6 | 10 | 14.5 | 25 | 25.8 | 20 | 12.9 | 10 | 5.2 | — | — | 5.4 | 1.4920 | 82.1 | wherein M is mole %, W is weight %, F/P is mole ratio of fluorine to phosphor, $\eta d$ is index of refraction, and $\nu d$ is Abbe's number.

While the invention has been described in detail and with reference to specific embodiments thereof, it will be apparent to one skilled in the art that various changes and modifications can be made therein without departing from the spilit and scope thereof.

What is claimed is:

1. An optical glass having a refractive index ($\eta d$) of 1.47 to 1.53 and an Abbe's number $\nu d$ of 77 and 85 and consisting essentially of the following composition:

| Component | Mole % |
|---|---|
| Al(PO$_3$)$_3$ | 8–11 |
| MPO$_3$ | 0.5–5 |
| BaF$_2$ | 5–25 |
| SrF$_2$ | 10–35 |
| CaF$_2$ | 5–30 |
| MgF$_2$ | 5–20 |
| AlF$_3$ | 13–30 |
| LaF$_3$ + YF$_3$ | 0–10 | wherein the mole ratio of fluorine to phosphorus (F/P) is 6.5 or less, and M represents at least one of Li, Na or K.

2. The optical glass of claim 1, in which the combined amount of Al(PO$_3$)$_3$ and MPO$_3$ is 13 to 16 mol % and the combined amount of BaF$_2$, SrF$_2$, CaF$_2$ and MgF$_2$ is 40 to 83 mole %.

3. The optical glass of claim 1, wherein said mole ratio (F/P) is 4.7 to 6.5.

4. The optical glass of claim 1, wherein said glass is fusible at temperatures of 800° to 1,100° C.

5. The optical glass of claim 1, wherein said glass is cast molded at a temperature of 650° to 750° C.

6. The optical glass of claim 1, wherein MPO$_3$ is a mixture of NaPO$_3$ and KPO$_3$.

* * * * *